(12) United States Patent
Kogure et al.

(10) Patent No.: US 7,151,224 B2
(45) Date of Patent: Dec. 19, 2006

(54) CONTINUOUS ELECTRIC POWER-SUPPLYING DEVICE

(75) Inventors: Naoto Kogure, Shizuoka (JP); Hironori Ochiai, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/164,297

(22) Filed: Nov. 17, 2005

(65) Prior Publication Data

US 2006/0131048 A1    Jun. 22, 2006

(30) Foreign Application Priority Data

Dec. 22, 2004    (JP)    ............... 2004-371180

(51) Int. Cl.
*H02G 3/04*    (2006.01)
(52) U.S. Cl. ............... 174/72 A; 174/71 R; 174/72 R
(58) Field of Classification Search ............ 174/72 A, 174/135, 72 R, 71 R
See application file for complete search history.

(56) References Cited

U.S. PATENT DOCUMENTS

2003/0121692 A1*    7/2003    Kato et al. .................. 174/68.1

FOREIGN PATENT DOCUMENTS

JP    2001-354085    12/2001

* cited by examiner

*Primary Examiner*—Jinhee Lee
(74) *Attorney, Agent, or Firm*—Armstrong, Kratz, Quintos, Hanson & Brooks, LLP (57) ABSTRACT

A wiring harness is arranged along a curved flection-regulating wall in a protector of a continuous electric power-supplying device. A flat spring is disposed along the flection-regulating wall. A spring holder is fixed to the flat spring. The wiring harness is fixed to the spring holder. Sliding projections for sliding on the flection-regulating wall are disposed on the spring holder. The sliding projections are ribs arranged in a longitudinal direction of the flection-regulating wall.

10 Claims, 8 Drawing Sheets

CONTINUOUS ELECTRIC POWER-SUPPLYING DEVICE

This application is based on Japanese Patent Application No. 2004-371180 filed in Japan Patent Office on Dec. 22, 2004, the contents of which are hereby incorporated by reference.

FIELD OF THE INVENTION

The present invention relates to a continuous electric power-supplying device in which a slack of a wiring harness is absorbed by a spring holder sliding along a flection-regulating wall for regulating a bend of the wiring harness, said wiring harness being fixed to the spring holder fixed to a flat spring in a protector and bent along the flection-regulating wall of the protector.

BACKGROUND OF THE INVENTION

Figure 10:
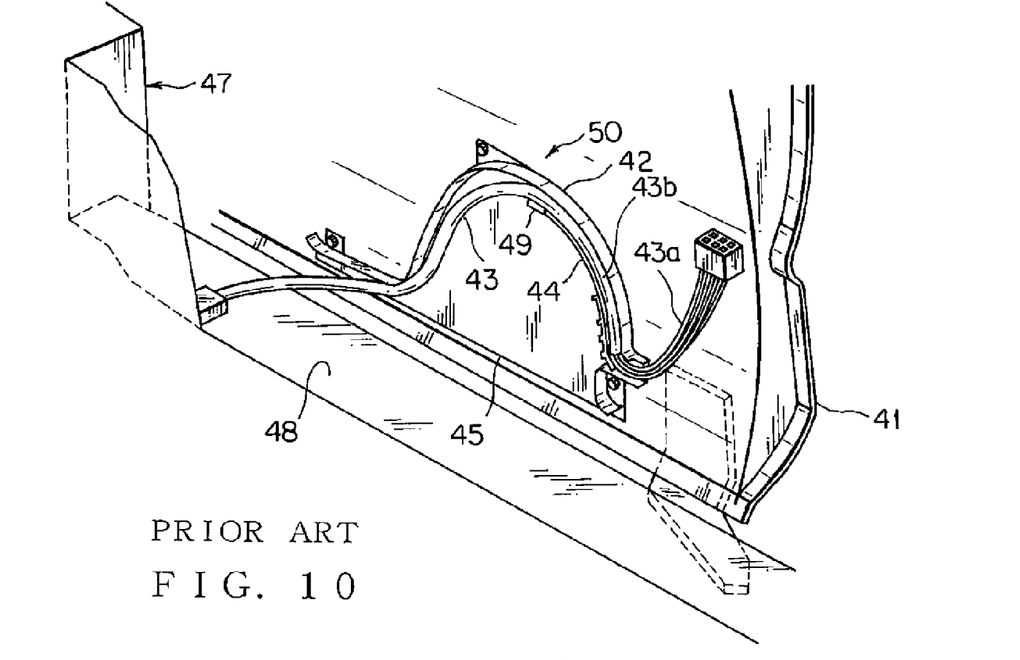
FIG. 10 is a perspective view showing a first embodiment of a conventional continuous electric power-supplying device having a fully closed door.
Figure 11:
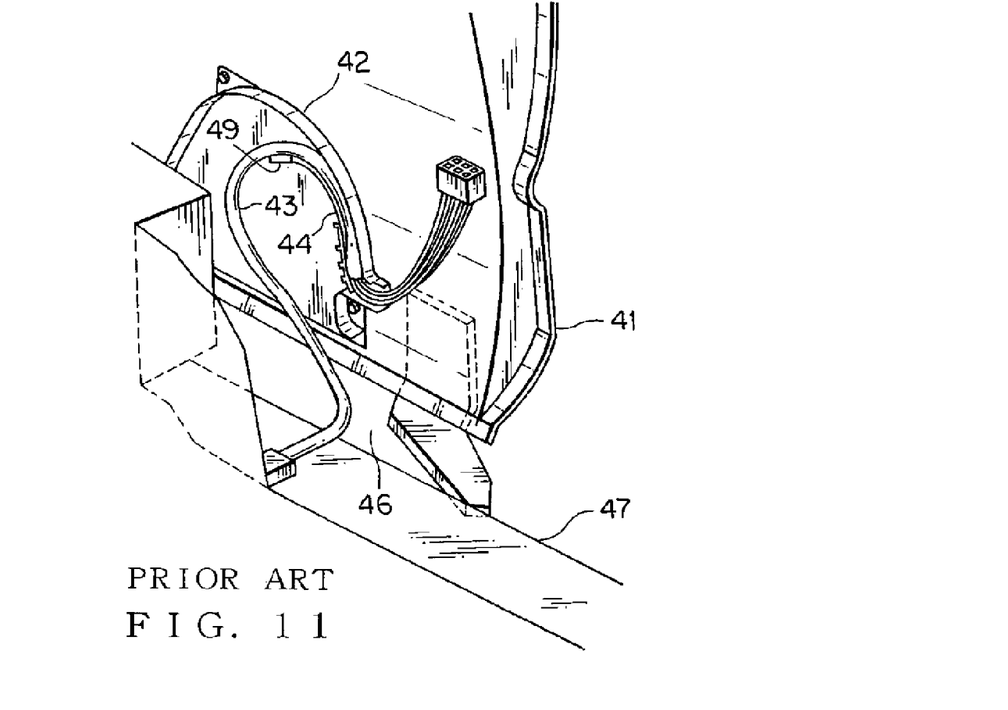
FIG. 11 is a perspective view showing the first embodiment of the conventional continuous electric power-supplying device having a half-opened door.

As shown in FIGS. 10 to 11, a first embodiment of a conventional constant electric power-supplying device 50 is disclosed in Japanese patent application No. JP-A, 2001-354085 (pages 7 to 9 and 11, FIGS. 4, 7, 13).

This supplying device 50 is arranged in a sliding door 41 of a vehicle, and includes a protector 42 made of synthetic resin for bendably receiving a wiring harness 43 (a cover of the protector 42 is omitted in FIGS. 10, 11), and a metallic flat spring 44 for pushing upward the wiring harness 43 in the protector 42.

A lower end of the flat spring 44 and the wiring harness 43 are fixed to the protector 42 at a lower front thereof. A front side of the flat spring 44 supports the wiring harness 43 slidably. A spring cap 49 made of synthetic resin is mounted on the flat spring 44 at a front end thereof. The spring cap 49 firmly supports the wiring harness 43.

The wiring harness 43 is composed of a plurality of electric wires 43a covered by a corrugate tube 43b made of synthetic resin. A lower front part of the corrugate tube 43b is fixed to the protector 42 by such as a rolling tape. The corrugate tube 43b is easy to be bent by having grooves and projected lines arranged alternately.

The wires 43a at one end of the wiring harness 43 is led out from a front end of the protector 42 and connected to an auxiliary at the sliding door side. The corrugate tube 43b of the wiring harness 43 is arranged swingably in a vehicle body 47 through an oblong bottom opening 45 of the protector 42 and a connecting space 46. In the connecting space 46, the corrugate tube 43b covers and protects the wire 43a from outer interference, water drops, dusts, and the like.

As shown in FIGS. 10 and 11, the wiring harness 43 is pulled backward in a fully closed sliding door 41 and pulled forward in the fully opened sliding door 41. In the half opened sliding door 41, the flat spring 44 pushes upward the wiring harness 43 to absorb the slack of the wiring harness 43. Therefore, the flat spring 44 prevents the wiring harness 43 from being caught in the sliding door 41 at the slack of the wiring harness 43.

Figure 12:
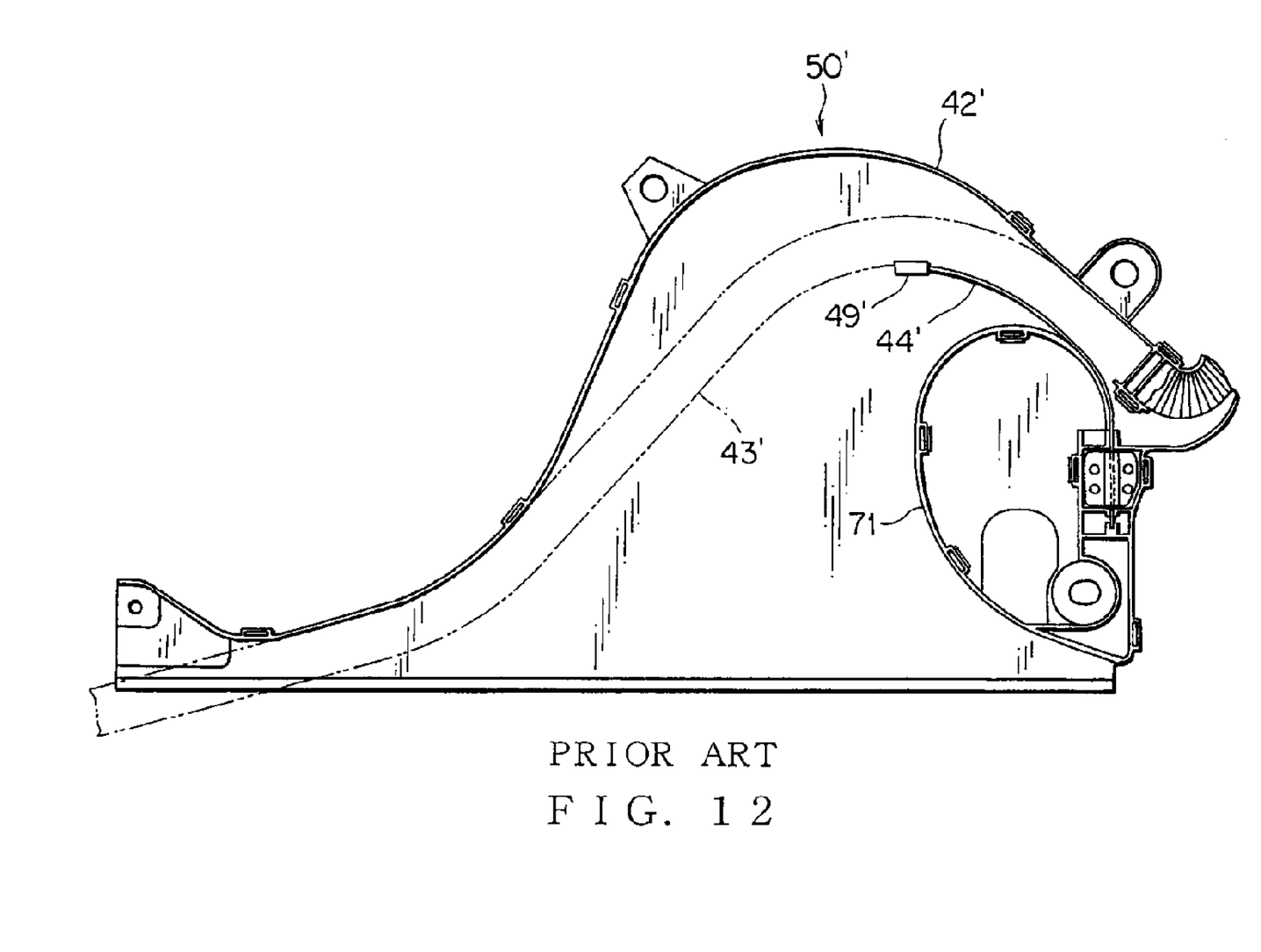
FIG. 12 is a front view showing a second embodiment of the conventional continuous electric power-supplying device.

As shown in FIG. 12, a second embodiment of a conventional electric power-supplying device 50' has a flection-regulating wall 71 mounted on a protector base. This flection-regulating wall 71 is in a half looped shape and prevents the wiring harness 43' and the flat spring 44' from being bent in a radius less than a radius of the flection-regulating wall 71.

When the sliding door 41 is pulled rapidly to be fully opened, the wiring harness 43' is strongly pulled forward, however, the wiring harness 43' and the flat spring 44' abut on the flection-regulating wall 71 and the further bends thereof are prevented. Therefore, damage of the wiring harness 43', degradation of the flat spring 44' and the like are prevented.

However, in the conventional electric power-supplying device 50', for example, when the flat spring 44' becomes longer corresponding to an increase of the slack of the wiring harness 43', and a spring cap 49' made of synthetic resin and attached to a front end of the flat spring 44' contacts slidingly with the flection-regulating wall 71, there is a problem that excessive repetition of the slides may abrade the flection-regulating wall 71 and the spring cap 49' or frictional resistance between the flection-regulating wall 71' and the spring cap 49' may increase. Thereby, it may be difficult to lead out the wiring harness 43' for absorbing the slack thereof. Further, there is another problem that an increase of the slack to be absorbed enlarges the protector 42' in a height direction and restricts layout design flexibility of components to be mounted on the sliding door 41.

Accordingly, an object of the present invention is to provide a continuous electric power-supplying device to decrease frictional resistance between the spring cap as a harness retaining member attached to the flat spring and the flection-regulating wall for easily leading out the wiring harness, easily absorbing the slack of the wiring harness and allowing the protector to have a lower height.

SUMMARY OF THE INVENTION

In order to attain the object, according to the present invention, there is provided a continuous electric power-supplying device including:
  a wiring harness;
  a protector;
  a flection-regulating wall in the protector along which the wiring harness being arranged;
  a flat spring disposed along the flection-regulating wall;
  a spring holder fixed to the flat spring and to which the wiring harness being fixed;
  a projection disposed on the spring holder for slidably contacting with the flection-regulating wall, Preferably, the projection for slidably contacting with the flection-regulating wall is a rib extends along a longitudinal direction of the flection-regulating wall.

Preferably, only one rib is disposed on the spring holder at the center of a lateral direction thereof.

Preferably, a pair of ribs is disposed on the spring holder at both sides of a lateral direction thereof.

Preferably, one rib is disposed at the center of a lateral direction of one half of the spring holder, and two ribs are disposed at both sides of the lateral direction of the other half of the spring holder.

Preferably, the rib is arranged diagonally to the spring holder.

Preferably, the spring holder is formed in a curve shape along the flection-regulating wall, and the ribs are arranged flexuously along the curved spring holder.

Preferably, the flection-regulating wall is formed in a substantially arced shape, and the wiring harness is arranged in a looped shape along the flection-regulating wall.

These and other objects, features, and advantages of the present invention will become more apparent upon reading of the following detailed description along with the accompanied drawings.

DESCRIPTION OF THE PREFERRED EMBODIMENTS

A first embodiment of a continuous electric power-supplying device 1 according to the present invention will be described below with reference to FIGS. 1 to 6.

Figure 1:
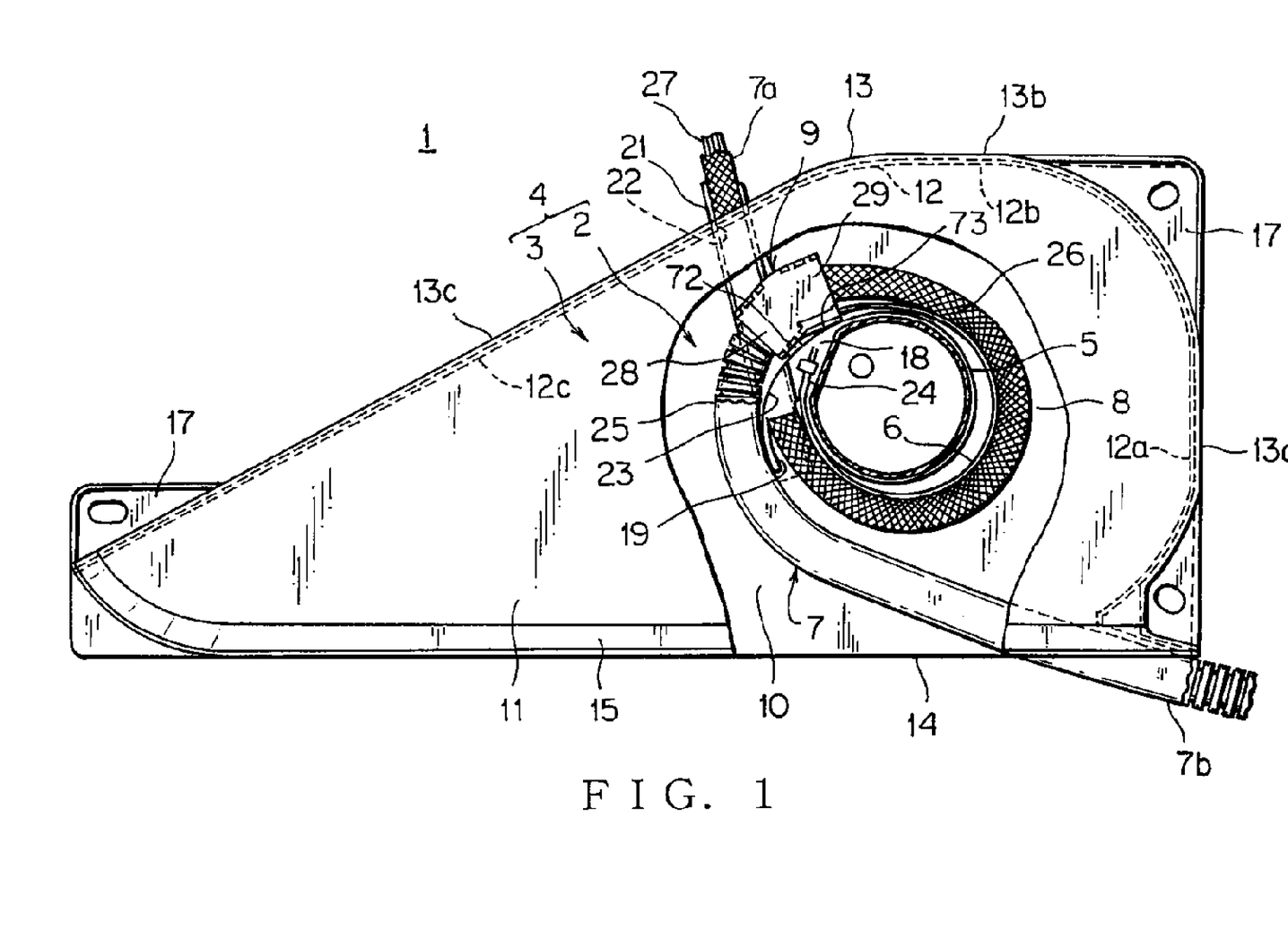
FIG. 1 is a partially cross-sectional view showing a main part of a continuous electric power-supplying device having a fully opened door according to a first embodiment of the present invention.

As shown in FIG. 1, the power-supplying device 1 includes: a protector 4 formed by a base 2 and a cover 3 made of synthetic resin; a metallic flat spring 6 bendably mounted along a circular flection-regulating wall 5 in the base 2; a curved wiring harness 7 disposed along the flection-regulating wall 5 in a looped shape; and a spring holder (harness retaining member) 9 made of synthetic resin, fixed to a front end of the flat spring 6, and connecting protective tubes 25, 26 to each other at the center of the wiring harness 7 in a longitudinal direction. The protective tubes 25, 26 cover an outer periphery of the wiring harness 7. The power-supplying device 1 is mainly mounted on a sliding door (not shown) of a vehicle.

The base 2 and the cover 3 of the protector 4 include: vertical substrates 10, 11 both having a substantially triangular shape or a trapezoidal shape; narrow peripheral walls 12, 13 crossing to the substrates 10, 11 at upper, front, and back sides thereof. The peripheral walls 12, 13 includes: substantially vertical front end walls 12a, 13a; horizontal short upper end walls 12b, 13b; and sloped long back walls 12c, 13c. The base 2 and the cover 3 are connected together in a manner that the peripheral wall 13 of the cover 3 overlaps with the peripheral wall 12 of the base 2, thereby an oblong opening 14 (harness outlet) for leading out the wiring harness 7 is formed at a lower end of the protector 4.

A harness-guiding wall 15 having a curved section is formed outward near the opening 14 at the lower side of the cover 3. A circular wall (not shown) projects from the substantially center of the cover 3 for engaging with an inner wall of the flection-regulating wall 5 of the base 2. The protector 4 is formed lower than a conventional protector 42' shown in FIG. 12. This is because the curved wiring harness 7 covered by a flexible mesh tube 26 is received in the protector 4 in a looped shape with a small radius along the flection-regulating wall 5. The protector 4 is fixed to the sliding door in a longitudinal direction thereof by a bracket 17.

The flection-regulating wall 5 is integrally formed with the base 2 at the substantially center thereof. A spring fixing part 18 is integrally formed with the flection-regulating wall 5 at a rear side thereof (at a left side in FIG. 1). The substrate 10 includes a harness outlet groove 19 next to a backside of the spring fixing part. A tubular wall 21 extending upward from the substrate 10 includes the harness outlet groove 19 inside a wall thereof. The peripheral wall 12 of the base 2 crossing the harness outlet groove 19 includes a notch 22 for inserting the wiring harness 7. A curved harness-guiding wall 23 is extended continuously from the upper side of the flection-regulating wall 5 next to the backside of the harness outlet groove 19 in a spiral shape. The harness-guiding wall 23 also works as a flection-regulating wall. The flection-regulating wall 5 and the harness-guiding wall 23 are integrally formed in a substantially circular shape. Incidentally, a back and forth direction of the power-supplying device 1 corresponds to that of the vehicle.

At the spring fixing part 18, a base end of the flat spring 6 is pressed into and fixed to the slit 24 so that the flat spring 6 having restoring force outward for increasing the bending radius is bent along the flection-regulating wall 5. The flat spring is flat in an unloaded condition, and bent resiliently in the protector 4.

The wiring harness 7 is arranged in a looped shape along the flat spring 6 and the flection-regulating wall 5. One end 7a of the wiring harness 7 is led out upward from the harness outlet groove 19 and fixed to the tubular wall 21. The wiring harness 7 through the outlet groove 19 is arranged in the sliding door to be connected to various auxiliaries (not shown) such as a power window, a door locking unit, and a door mirror unit. The other end 7b of the wiring harness 7 is led out from the guiding wall 23 through the lower opening 14 to a body of the vehicle. The wiring harness 7 and the spring holder 9 smoothly slide along an inner wall of the substrate 10 without interfering with the wiring harness 7 disposed in the harness outlet groove 19.

The spring holder 9 is fixed to the front end of the flat spring 6. A corrugate tube 25 covering the wiring harness 7 is fixed to one end of the spring holder 9. A mesh tube 26 covering the wiring harness 7 is fixed to the other end of the spring holder 9. The mesh tube 26 covers from the harness outlet groove 19 to the spring holder 9, and the corrugate tube 25 covers from the spring holder 9 through the lower opening 14 to the vehicle body. The spring holder 9 connects the mesh tube 26 and the corrugate tube 25.

The mesh tube 26 is more flexible than the corrugate tube 25. The corrugate tube 25 is harder and has higher water resistance than the mesh tube 26. The corrugate tube 25 reliably protects electric wires inside the wiring harness 7 from outer interference, water, and the like. The corrugate tube 25 is formed by arranging grooves and projected lines alternately. The corrugate tube 25 of the first embodiment has an oval section. The wiring harness 7 is composed of the corrugate tube 25, the mesh tube 26, and a plurality of electric wires 27 received therein.

The spring holder 9 is curved in a substantially dogleg shape in two directions tangential to the flection-regulating wall 5. Ribs (sliding projections) 72, 73 are formed integrally with the spring holder 9 for smoothly sliding on the flection-regulating wall 5 and the harness-guiding wall 23 with the low frictional resistance. The ribs 72, 73 of the spring holder 9 slidably contact with the flection-regulating wall 5. Since the ribs 72, 73 reduce a total contact area between the spring holder 9 and the flection-regulating wall 5 and reduce the frictional resistance, a radius of the wiring harness 7 surely and smoothly is increased and decreased without any catch.

The spring holder 9 includes a first fixing part 28 at the front side thereof for fixing the corrugate tube 25 and a second fixing part 29 at the back side thereof for fixing the mesh tube 26. The rib 72 is disposed on the first fixing part 28, and the rib 73 is disposed on the second fixing part 29. The ribs 72, 73 are arranged along the longitudinal direction of the wiring harness 7 and cross each other in the substantially dogleg shape. When one rib 72 contacts with the flection-regulating wall 5, the other rib 73 simultaneously contacts with the flection-regulating wall 5, thereby the spring holder 9 stably slides along the flection-regulating wall 5 with the ribs 72, 73.

The counter side of the spring holder 9 opposed to the ribs 72, 73 may be formed in a dogleg shape, or a curved shape. The ribs 72, 73 are not limited to be in the dogleg shape, and may be in a curved shape or an arced shape along the flection-regulating wall 5. However, since the flection-regulating wall 5 with the harness-guiding wall 23 is not in a perfect circular shape, the substantially dogleg shape of the ribs 72, 73 is preferable for stably sliding on the flection-regulating wall 5.

FIG. 1 shows a fully opened sliding door at a right side of a vehicle. The sliding door slides backward with the power-supplying device 1. The corrugate tube 25 is led forward (a harness fixing side of the vehicle) from the lower opening 14 of the protector 4. A radius formed by the mesh tube 26 and a part of the corrugate tube 25 continued to the spring holder 9 decreases in a looped shape along the flection-regulating wall 5 and the harness-guiding wall 23. The spring holder 9 smoothly slides with the ribs 72, 73 in the small contact area with the low frictional resistance along the flection-regulating wall 5. A radius of the flat spring 6 decreases along the flection-regulating wall 5 to the minimum in a substantially ring shape while the flat spring 6 contacts with the mesh tube 26 of the wiring harness 7.

Since the ribs 72, 73 of the spring holder 9 smoothly slides on the flection-regulating wall 5 with the low frictional resistance, the radius of the wiring harness 7 is smoothly decreased and increased without any catch, namely, the wiring harness 7 is smoothly and reliably led out from and into the protector 4. Since the ribs 73, 74 are arranged in a moving direction of the spring holder 9 against the flection-regulating wall 5, the ribs 72, 73 smoothly slides on the flection-regulating wall 5 in a substantially line contact at the center of the ribs 72, 73 of a lateral direction thereof.

In FIG. 1, the restoring force of the flat spring 6 works the spring holder 9 to press outward, and a loop part 8 of the wiring harness 7 for expanding the loop at the middle of the flat spring 6 in the longitudinal direction thereof.

Figure 2:
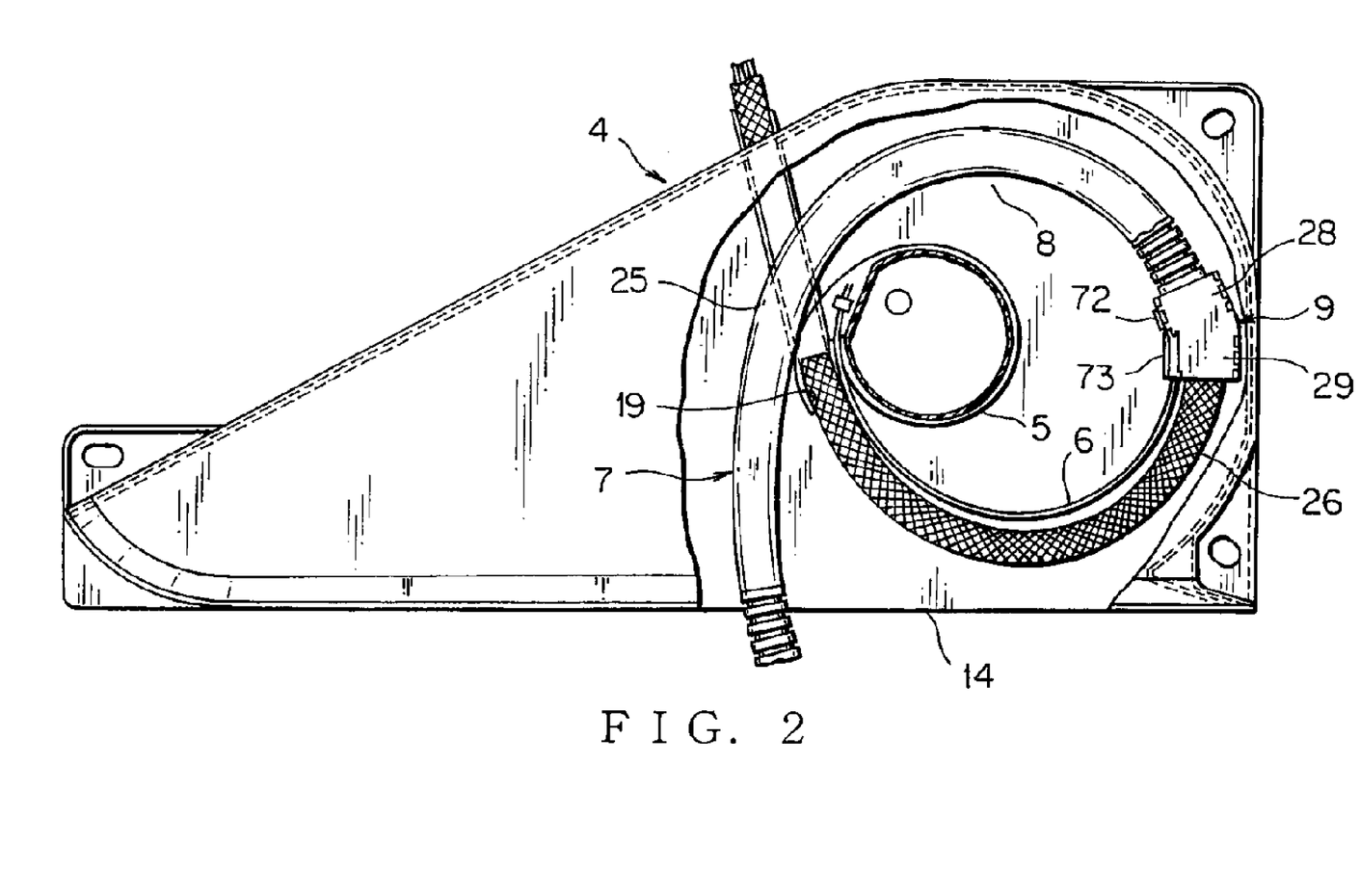
FIG. 2 is a front view showing the power-supplying device having a half-opened door.

FIG. 2 shows the half-opened sliding door. A slack of the corrugate tube 25 between the vehicle body and the sliding door is surely absorbed by the increase of the radius of the loop part 8 of the wiring harness 7 owing to the restoring force of the flat spring 6.

When the radius of the loop part 8 is increased or decreased, the ribs 72, 73 of the spring holder 9 smoothly slide on the flection-regulating wall 5 without any catch. Therefore, the restoring force of the flat spring 6 is surely transmitted to the loop part 8 and the slack is absorbed efficiently.

Since the corrugate tube 25 and the mesh tube 26 are connected to the spring holder 9 and the flat spring 6 is connected to the spring holder 9, the restoring force of the flat spring 6 works directly to the corrugate tube 25 and the mesh tube 26. Therefore, the radius of the loop part 8 is reliably increased or decreased and the slack of the wiring harness 7 is surely absorbed.

When the sliding door is fully opened from the half-opened state shown in FIG. 2, the power-supplying device 1 slides forward with the sliding door, and the corrugate tube 25 is led out backward through the lower opening 14 to a harness fixing part at the vehicle body side (not shown). The radius of the loop part 8 is smaller than that in the fully opened sliding door shown in FIG. 1. The radius of the flat spring 6 is deceased with the loop part 8. The corrugate tube 25 of the wiring harness 7 is moved backward in the lower opening.

When the fully closed sliding door slides to be opened, the flat spring 6, the spring holder 9, the corrugate tube 25 and the like work vice versa.

Figure 3:
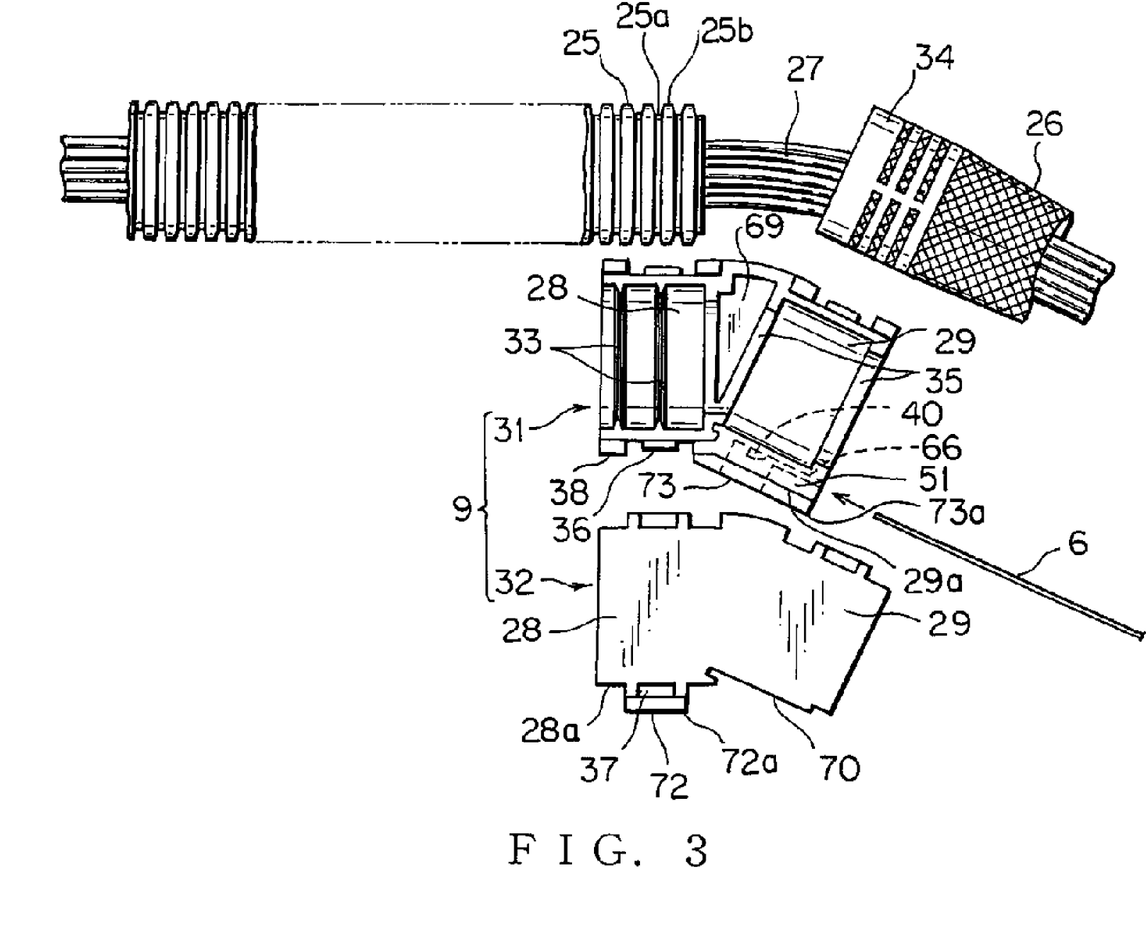
FIG. 3 is an exploded front view showing a spring holder and a wiring harness according to the first embodiment of the present invention.

FIG. 3 shows one embodiment of a connection structure between the spring holder 9 and the tubes 25, 26 in the power-supplying device 1 according to the present invention.

The spring holder 9 is formed by a holder base 31 and a holder cover 32 both made of synthetic resin. Each of the holder base 31 and the holder cover 32 is in a substantially symmetric half ring or U shape, bent in a substantially dogleg shape at the center thereof, and includes a first fixing part 28 for the corrugate tube 25 at one side thereof, and a second fixing part 29 for the mesh tube 26 at the other side thereof.

The first fixing part 28 includes a plurality (two in this embodiment) of parallel projected lines 33 interposed between a front end and an intermediate part of an inner wall thereof for engaging with grooves 25*a* in the corrugate tube 25. The second fixing part 29 includes a pair of projected lines 35 disposed on front and back sides of an inner wall thereof for holding an inserted member 34. A pitch of the projected lines 33 is n times more than that of the grooves 25*a* of the corrugate tube 25 (where n is an integer such as 1, 2, 3, or the like). The pitch of the projected lines 35 is a little larger than a length of the inserted member 34. Each of the grooves 25*a* is interposed between the projected lines 25*b* next thereto.

The holder base 31 and the holder cover 32 are connected to each other by locking members such as a locking projection 36, a resilient engaging frame piece 37 to be a tubular member having a substantially oval or rectangular section. The spring holder 9 includes an inner wall having a substantially oval section and an outer wall having a substantially rectangular section. The locking members are not limited to the locking projection 37 and the engaging frame piece 37. A locking arm, an engaging concave, and the like may be used as the locking members.

The rib 72 as a sliding member of the first fixing part 28 is mounted on the holder cover 32. The rib 73 as a sliding member of the holder base 31 is mounted on the holder base 31. A flat spring fixing part 51 is formed at a bottom of the holder base 31. The rib 73 is formed integrally with a bottom wall 29a of the flat spring fixing part 51. The flat spring fixing part 51 is coupled with the second fixing part 29 of the holder cover 32 at a bottom part thereof.

Figure 4:
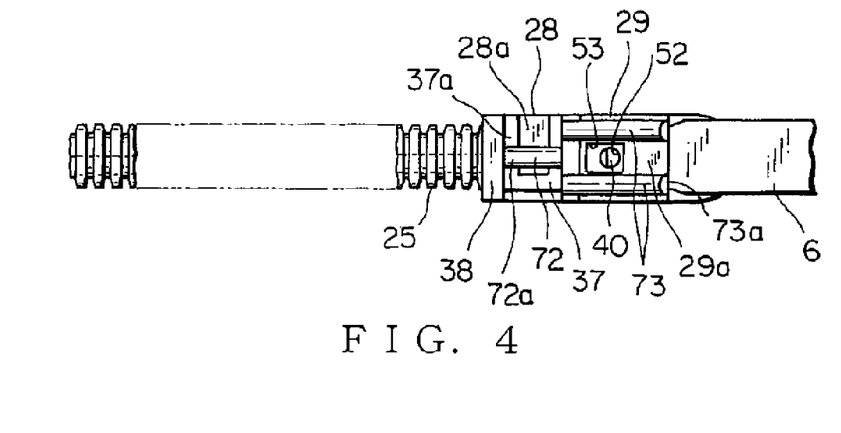
FIG. 4 is a plan view from a sliding rib showing the assembled spring holder according to the first embodiment of the present invention.

As shown in FIG. 4, the one rib 72 is disposed at the center of a bottom wall 28a of the first fixing part 28 of the lateral direction thereof. The pair of the ribs 73 is disposed at both sides of the lateral direction of a bottom wall 29a of the second fixing part 29. The ribs 72, 73 are formed straight in a longitudinal direction of the wiring harness 7. The center rib 72 is formed integrally with the engaging frame piece 37 and projected from a surface thereof as to connect a pair of elongated parts 37a of the engaging frame piece 37.

The locking projection 36 enters an inner space inside the rib 72 in the engaging frame piece 37. A projected line 38 is disposed next to the engaging frame piece 37 for guiding and protecting the locking projection 36. The projected line 38 is lower than the rib 72 so as not to slidably contact with the flection-regulating wall 5 of the protector 4 normally. The pair of the ribs 73 is disposed a little inner than an outer wall of the second fixing part 29.

The ribs 72, 73 are parallel to each other. A width of the center rib 72 is narrower than that of the bottom wall 29a interposed between the pair of the ribs 73. A length of the rib 72 is substantially half a length of each rib 73. The pair of the rear ribs 73 stabilizes the spring holder 9 against the flection-regulating wall 5. Since contacting with the flection-regulating wall 5 at three points, the ribs 72, 73 stably and smoothly slide on the flection-regulating regulating wall 5.

Each of the ribs 72, 73 has a semicircular or substantially arc section so as to smoothly slide on the flection-regulating wall 5 by a substantially line contact. Smooth chamfered edges 72a, 73a having a tapered or curved shape are formed at front and rear ends of each of the ribs 72, 73. Thereby, the ribs 72, 73 smoothly slide on the flection-regulating wall 5 without any catch. Here, the front end means an extended front-end of the flat spring 6.

As shown in FIG. 3, a substantially sectored room 69 is formed between the first fixing part 28 and the second fixing part 29 of the spring holder 9. In the sectored room 69, a plurality of electric wires 27 are exposed and extend to both the corrugate tube 25 and the mesh tube 26 of the wiring harness 7.

The inserted member 34 of the mesh tube 26 is made of synthetic resin and has a substantially oval section. The inserted member 34 is formed by insert-molding, namely, an end part of the mesh tube 26 is inserted into the synthetic resin in a mold. The end part of the mesh tube 26 is integrally fixed to an interior of the inserted member 34.

A slit 66 for inserting and locking the flat spring 6 and a locking projection 40 are formed on the flat spring fixing part 51. The locking projection 40 includes a locking wall perpendicular to a guiding slope for the flat spring 6.

A width of a distal end of the flat spring 6 is formed a little narrower. As shown in FIG. 4, the narrower part of the flat spring 6 has a circular engaging hole 52 for the substantially circular locking projection 40. The bottom wall 29a of the holder base 31 has an opening 53 facing the locking projection 40. A structure for fixing the flat spring 6 of this embodiment is similar to that of a conventional spring cap. A sloping angle between the rib 72 of the first fixing part 28 and the ribs 73 of the second fixing part 29 is the same as an angle between lines of the ribs 72, 73 tangential to the flection-regulating wall 5.

Figure 5:
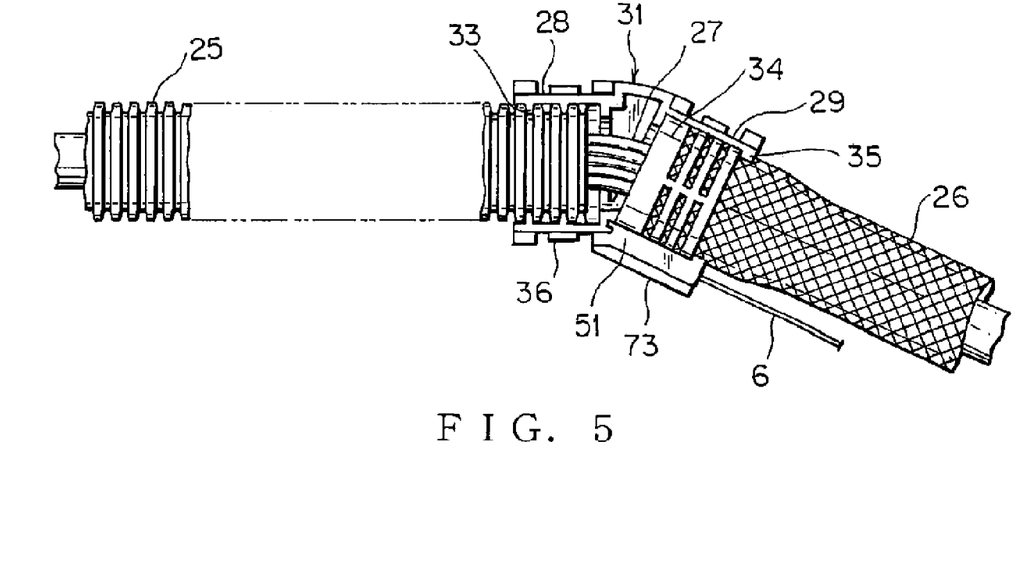
FIG. 5 is a front view showing the wiring harness assembled with a holder base according to the first embodiment of the present invention.
Figure 6:
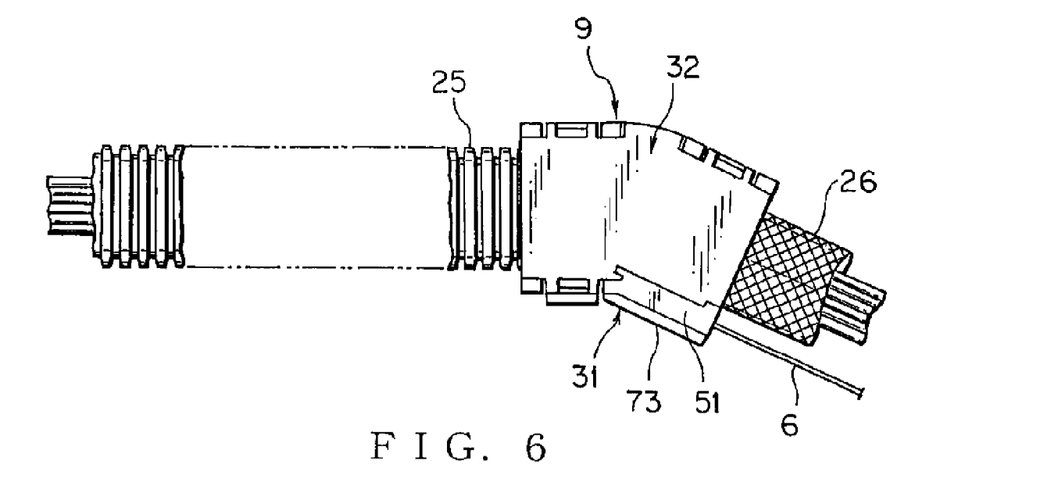
FIG. 6 is a front view showing the assembled spring holder according to the first embodiment of the present invention.

As shown in FIG. 5, the spring holder 9 is assembled by firstly inserting the electric wires 27 into both the corrugate tube 25 and the mesh tube 26, then engaging the end part of the corrugate tube 25 with the first fixing part 28 of the holder base 31, then engaging the inserted member 34 of the mesh tube 26 with the second fixing part 29, and finally engaging the holder cover 32 with the holder base 31 as shown in FIG. 6. The spring holder 9 easily and firmly connects the corrugate tube 25 and the mesh tube 26 against such as pulling force.

Incidentally, in the embodiment described above, the one rib 72 is disposed at the front center of the lateral direction of the spring holder 9, and two ribs 73 are disposed at both rear sides thereof. However, instead of this, two ribs may be disposed at both front sides of the spring holder 9, and one rib may be disposed at a back center thereof. In the embodiment as shown in FIG. 4, since the two ribs 73 are disposed at the rear sides near the flat spring 6, the ribs 73 stably support the spring holder 9 and reliably prevent a twist of the flat spring 6 or the like.

Incidentally, in the embodiment described above, the corrugate tube 25 and the mesh tube 26 are used as protecting tubes. However, flexible thin vinyl tube (not shown) may be used instead of the mesh tube 26.

Further, the corrugate tubes 25 may be fixed to both the first fixing part 28 and the second fixing part 29 of the spring holder 9. Otherwise, the mesh tubes 26 may be fixed to the same. When the two corrugate tubes 25 are used, the second fixing part 29 is formed similar to the first fixing part 28. When the two mesh tubes 26 are used, the first fixing part 28 is formed similar to the second fixing part 29.

The oval section of the corrugate tube 25 is aimed at reducing thickness of the protector 4. If the protector has enough room in the thickness direction, a corrugate tube having a circular section (not shown) may be used. In this case, the inner wall of the spring holder 9 has a circular section. The section of the mesh tube 26 may be formed optionally corresponding to the section of the corrugate tube 25.

Further, in the embodiment described above, the corrugate tube 25 and the mesh tube 26 are independently fixed to the spring holder 9. However, for example, both ends of the corrugate tube 25 and the mesh tube 26 may overlap with each other and be caught by the spring holder 9.

Further, in the power-supplying device 1 described above, the protector 4 is arranged vertically in the sliding door. However, for example, the protector 4 may be arranged horizontally in a vehicle body, and the wiring harness 7 may be led out from the oblong opening 14 toward the sliding door, and arranged in the vehicle body through the harness outlet groove 19 in the protector 4. Further, the power-supplying device 1 is applicable to a sliding seat of a vehicle, and sliding doors other than the sliding door for a vehicle.

Figure 7A:
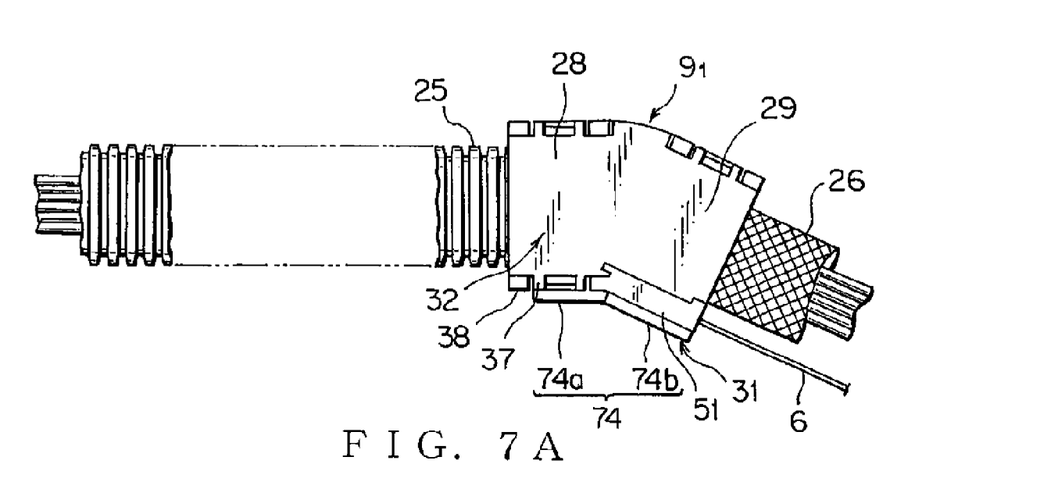
FIG. 7A is a front view showing the rib mounted on the spring holder according to a second embodiment of the present invention.
Figure 7B:
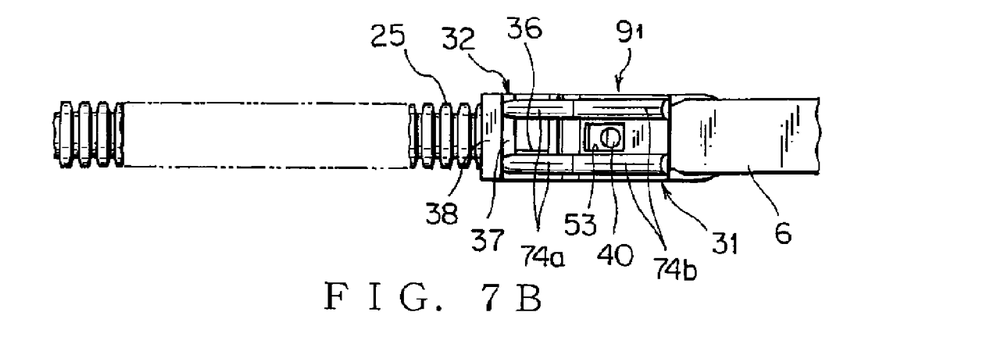
FIG. 7B is a plan view showing the rib according to the second embodiment of the present invention.
Figure 8:
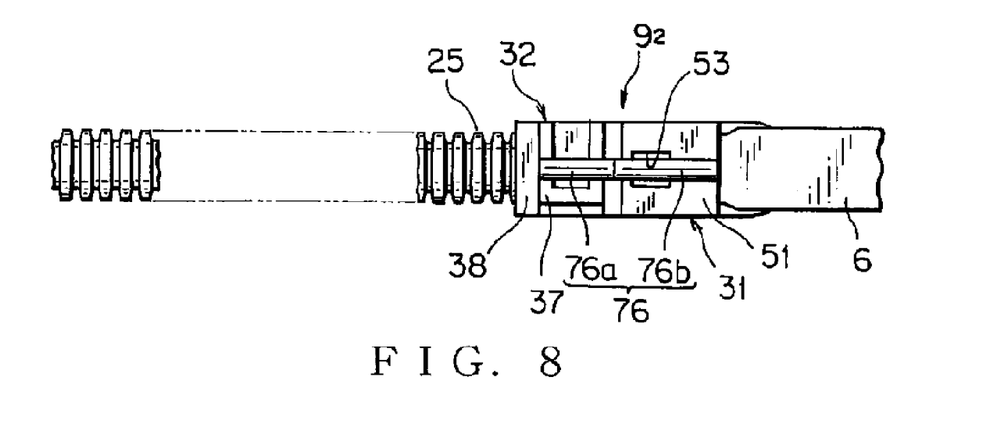
FIG. 8 is a plan view showing the rib according to the third embodiment of the present invention.
Figure 9:
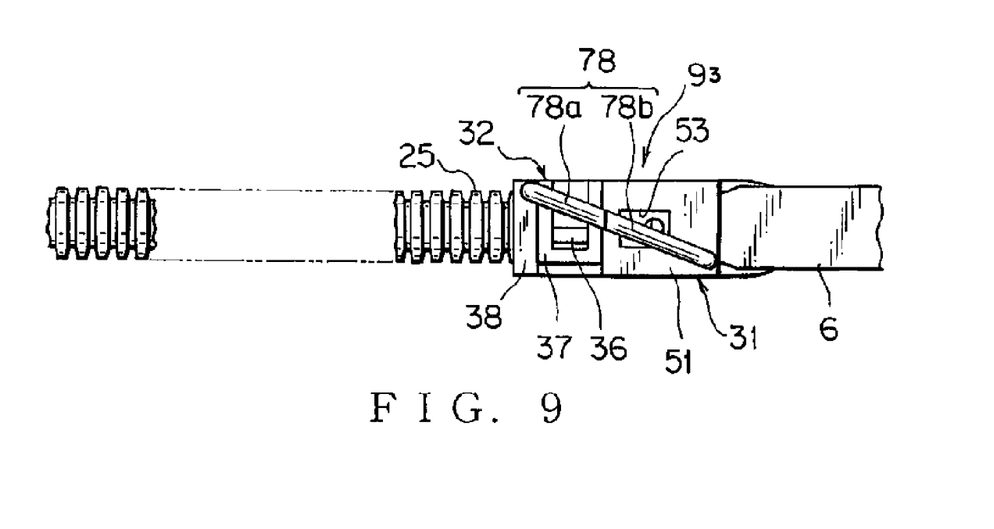
FIG. 9 is a plan view showing the rib according to the fourth embodiment of the present invention.

FIGS. 7 to 9 show various embodiments of the ribs as sliding members of the spring holder 9. Identical elements will be designated by identical reference numbers and only the difference existing in comparison with the first embodiment will be explained.

As shown in FIG. 7A, according to a second embodiment of the present invention, a spring holder $9_1$ includes two pairs of ribs 74a, 74b disposed at the first fixing part 28 and the second fixing part 29 in a line. Like the first embodiment, the ribs 74a at the front side and the ribs 74b at the rear side of a holder body of the spring holder $9_1$ cross to each other in a substantially dogleg shape in a thickness direction of the flection-regulating wall 5. Here, the holder body of the spring holder $9_1$ means the part made of synthetic resin other than the ribs 74a, 74b.

Like the first embodiment, the front ribs 74a are formed integrally with the engaging frame piece 37 of the first fixing part 28 of the holder cover 32. Front ends of the front ribs 74a are next to the projected line 38 disposed perpendicular thereto. The rear ribs 74b are formed integrally with the flat spring fixing part 51 of the holder base 31. The front and rear ribs 74a, 74b are connected to each other or contact with each other to be a pair of ribs 74. One of the pair of ribs 74a also works as to be engaged with the engaging frame piece 37. The ribs 74a, 74b have substantially semi-circular or arc sections like those in the first embodiment.

FIG. 7 shows a flat spring 6, a corrugate tube 25, a mesh tube 25, a locking projection 36 for engaging with the engaging frame piece 37, a locking projection 40 for locking the flat spring 6, and an opening 53.

Incidentally, the front and rear ribs 74a, 74b may be formed integrally with the holder base 31 instead of the holder cover 32, and the front ribs 74a may overlap with a bottom wall of the holder cover 32. Further, the front and rear ribs 74a, 74b may be formed integrally with the holder cover 32, and the rear ribs 74b may overlap with a bottom wall of the holder base 31. These structures are also applicable to the first embodiment of the present invention.

In any structure described above, the pairs of the ribs 74a, 74b of the spring holder $9_1$ stably slides on the flection-regulating wall 5 with low frictional resistance without falling down.

As shown in FIG. 8, according to a third embodiment of the present invention, a front rib 76a and a rear rib 76b are disposed in a line at the center of a holder body of a spring holder $9_2$ of the lateral direction thereof. Like the first embodiment shown in FIG. 5, the front and rear ribs 76a, 76b cross to each other in a substantially dogleg shape in a thickness direction of the flection-regulating wall 5. Here, the holder body of the spring holder $9_2$ means the part made of synthetic resin other than the ribs 76a, 76b.

The front rib 76a is formed integrally with the engaging frame piece 37 at the center of the bottom wall of the holder cover 32 of the lateral direction thereof. The rear rib 76b is formed at the center of the lateral direction of the flat spring fixing part 51 disposed at the bottom part of the holder base 31. Like the second embodiment, when the holder cover 32 and the holder base 31 are connected to each other or contact with each other, the front and rear ribs 76a, 76b are disposed next to each other in a line as one rib 76. The ribs 76a, 76b have substantially semi-circular or arc sections. A front view showing the spring holder $9_2$ is similar to FIG. 7A and therefore not shown.

Incidentally, the ribs 76a, 76b may be formed integrally together as a single rib on the holder base 31 instead of being formed on the holder cover 32, and the front rib 76a may overlap with the bottom wall of the holder cover 32. Otherwise reversely, the ribs 76a, 76b may be formed integrally together as a single rib on the holder cover 32 instead of being formed on the holder base 31, and the rear rib 76b may overlap with the bottom wall of the holder base 31.

In any structure described above according to the third embodiment, the center rib 76 of the spring holder $9_2$ solely slides on the flection-regulating wall 5 in an extremely small contact area with low friction force.

As shown in FIG. 9, according to a fourth embodiment of the present invention, a rib 78 is disposed on a diagonal line of a bottom wall of a spring holder $9_3$. Like the third embodiment, the rib 78 includes a front rib 78a and a rear rib 78b crossing to each other in a substantially dogleg shape in the thickness direction of the flection-regulating wall 5. Here, the holder body of the spring holder $9_3$ means the part made of synthetic resin other than the ribs 78a, 78b.

The front rib 78a is formed obliquely and integrally with the holder cover 32 from the projected line 38 at a front end thereof to the engaging frame piece 37. The rear rib 78b is formed obliquely and integrally with the flat spring fixing part 51 disposed at the bottom of the holder base 31 from a front end thereof to the rear end thereof. The front and rear ribs 78a, 78b have the same slope angle. The front and rear ribs 78a, 78b diagonally extends so that a front end of the front rib 78a is next to one sidewall of the spring holder $9_3$ and a rear end of the rear rib 78b is next to the other sidewall of the spring holder $9_3$.

Like the second embodiment, when the holder cover 32 and the holder base 31 are connected to each other, the front and rear ribs 78a, 78b are disposed next to each other or contact with each other in the diagonal line as one rib 78. The ribs 78a, 78b have substantially semi-circular or arc sections. A front view showing the spring holder $9_3$ is similar to FIG. 7A and therefor not shown. The diagonal ribs 78a, 78b slide on the flection-regulating wall 5 contacting evenly with the most part of the lateral direction thereof. Therefore, unbalanced abrasion of the flection-regulating wall 5 is prevented.

Incidentally, the ribs 78a, 78b may be formed integrally together as a single rib on the holder base 31 instead of being formed on the holder cover 32, and the front rib 78a may disposed diagonally on the bottom wall of the holder cover 32. Otherwise reversely, the ribs 78a, 78b may be formed integrally together as a single rib on the holder cover 32 instead of being formed on the holder base 31, and the rear diagonal rib 78b may overlap with the bottom wall of the holder base 31.

In any structure described above according to the third embodiment, the diagonal rib 78 of the spring holder $9_3$ solely slides on the flection-regulating wall 5 with low frictional resistance while contacting evenly with the most part of the lateral direction of the flection-regulating wall 5. Therefore, the unbalanced abrasion of the flection-regulating wall 5 is prevented even after repetitive slides for a long time, and the rib 78 constantly and smoothly slides on the flection-regulating wall 5 with low frictional force.

Arranging two diagonal ribs 78a and two diagonal ribs 78b in X-shape crossing each other, or two V-shapes parallel to each other prevents the unbalanced abrasion of the flection-regulating wall 5 and improves stability of the spring holder $9_3$ simultaneously.

Incidentally, in the embodiments described above, ribs 72 to 78 are mounted on the spring holder 9, $9_2$, $9_3$. However, for example, hemispherical projections may be mounted on the spring holder 9, $9_2$, $9_3$ in stead of the ribs 72 to 78. The hemispherical projection is not limited to one, and may be arranged respectively one by one at front and rear, at left and right of both front and rear, or a plurality of hemispherical projections may be arranged on the spring holder 9, $9_2$, $9_3$.

Further, in the embodiments described above, the spring holders 9, $9_2$, $9_3$ are curved in a substantially dogleg shape along the flection-regulating wall 5. However, for example, if the spring holders 9, $9_2$, $9_3$ are short in length, or a curved radius of the flection-regulating wall 5 is larger than that in FIG. 1, the spring holders 9, $9_2$, $9_3$ may be straight instead of being curved. In this case, the ribs 72 to 78 are also formed straight along the flat bottom wall of the spring holders 9, $9_2$, $9_3$.

Further, in the embodiments described above, the flection-regulating wall 5 is in a ring shape, and the wiring harness 7 is bent in a looped shape along the flection-regulating wall 5. However, for example, the spring holder 9 may be mounted on the flat spring 44' of the conventional power-supplying device 50' shown in FIG. 12, and the ribs 72 to 78 and the like may slide on the flection-regulating wall 71.

In summary, according to the power-supplying device 1 of the present invention described above, when the wiring harness is pulled out of the protector, while the wiring harness and the flat spring are bent in a small radius, the spring holder as a wiring harness retaining member smoothly slides on the flection-regulating wall at the projection thereof in a small contact area with low frictional resistance. Further, when the wiring harness is pulled into the protector by restoring force of the flat spring and the slack of the wiring harness is absorbed, while the wiring harness and the flat spring are bent in a large radius, the spring holder smoothly slides on the flection-regulating wall at the projection thereof in the small contact area with the low frictional resistance.

According to the power-supplying device 1 having the rib extending along the flection-regulating wall, when the wire harness is pulled out or in, the rib smoothly slides on the flection-regulating wall in an area less then a width thereof almost a line contact or a point contact with the low frictional resistance.

According to the power-supplying device 1 having only one rib disposed on the spring holder at the center of a lateral direction thereof, the rib contacts with the flection-regulating wall according to the balancing principle. Further, since the wiring harness is bent along the flection-regulating wall, the spring holder is disposed at the center of the bent portion of the wiring harness, and the rib is pushed against the flection-regulating wall, the spring holder surely slides on the flection-regulating wall with the center rib. Further, since only one rib is used, cost of the power-supplying device 1 may be reduced.

According to the power-supplying device 1 having a pair of ribs disposed on the spring holder at both sides of a lateral direction thereof, the pair of the ribs surely contacts with the flection-regulating wall and the spring holder is supported by the ribs of the lateral direction thereof. Therefore, the spring holder is prevented from falling down and interfering with such as the protector. Therefore, the spring holder is also prevented from making noise.

According to the power-supplying device 1 in which one of the ribs is disposed at the lateral center of one longitudinal side of the spring holder, and two of the ribs are disposed at both lateral sides of the other longitudinal side of the spring holder, three ribs surely support the spring holder and slide on the flection-regulating wall. The total contact area and frictional resistance with three ribs are smaller than those with the pair of the ribs disposed in the width (lateral) direction According to the power-supplying device 1 in which the rib is arranged diagonally to the spring holder, the diagonal rib contacts with the flection-regulating wall with a line contact along a substantially whole width thereof, so that the flection-regulating wall is prevented from being unevenly ablated, and the flection-regulating wall is ablated evenly along the substantially whole width thereof. Therefore, even after ablated excessively, the rib smoothly and surely slides on the flection-regulating wall without any catch and displacement.

According to the power-supplying device 1 in which the spring holder is formed in a curve shape along the flection-regulating wall, and the ribs are arranged along the curved spring holder, the ribs cross to each other and stably and continuously contact with the flection-regulating wall. Preferably, each rib extends in a corresponding tangential direction of the flection-regulating wall. When a bending radius of the flection-regulating wall is small, preferably, the spring holder is formed in a substantially dogleg shape.

According to the power-supplying device 1 in which the flection-regulating wall is formed in a substantially arced shape, and the wiring harness is arranged in a looped shape along the flection-regulating wall, a radius of the loop of the wiring harness is reduced when being pulled out from the protector, and is increased when being pulled into the protector (when the slack of the wiring harness is absorbed) by the restoring force of the flat spring. Thereby, the ribs of the spring holder smoothly slide on the flection-regulating wall in the small contact area with the low frictional resistance. Further, since the wiring harness is arranged in a looped shape in the protector, and the radius of the loop part thereof is reduced or increased through the flat spring, a height of the protector can be reduced.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A continuous electric power-supplying device including:
   a wiring harness comprising a corrugate tube, a mesh tube and a plurality of electric wires;
   a protector;
   a flection-regulating wall in the protector along which the wiring harness is arranged;
   a flat spring disposed along the flection-regulating wall;
   a spring holder fixed to the flat spring and to which the wiring harness is fixed, the spring holder enclosing the wire harness with both ends thereof respectively fixed to the corrugate tube and the mesh tube of the wire harness; and
   a projection disposed on the spring holder for slidably contacting with the flection-regulating wall.

2. The continuous electric power-supplying device as claimed in claim 1, wherein the projection for slidably contacting with the flection-regulating wall is a rib that extends along a longitudinal direction of the flection-regulating wall.

3. The continuous electric power-supplying device as claimed in claim 2, wherein one rib is disposed on the spring holder at the center of a lateral direction thereof.

4. The continuous electric power-supplying device as claimed in claim 2, wherein a pair of ribs is disposed on the spring holder at both sides of a lateral direction thereof.

5. The continuous electric power-supplying device as claimed in claim 2, wherein one rib is disposed at the center of a lateral direction of one half of the spring holder, and two ribs are disposed at both sides of the lateral direction of the other half of the spring holder.

6. The continuous electric power-supplying device as claimed in claim 2, wherein the rib is arranged diagonally to the spring holder.

7. The continuous electric power-supplying device as claimed in claim 2, wherein the spring holder is formed in a curved shape along the flection-regulating wall, and the ribs are arranged flexuously along the curved spring holder.

8. The continuous electric power-supplying device as claimed in claim 1, wherein the flection-regulating wall is formed in a substantially arced shape, and the wiring harness is arranged in a looped shape along the flection-regulating wall.

9. A continuous electric power-supplying device as claimed in claim 6, wherein spring holder includes a holder cover and a holder base with a flat spring fixing part and the rib includes a front rib formed obliquely and integral with the holder cover and a rear rib formed obliquely and integral with the flat spring fixing part of the holder base.

10. A continuous electric power-supplying device as claimed in claim 9, wherein the front and rear ribs are disposed along a common diagonal line.

* * * * *